United States Patent
Olaru (10) Patent No.: US 9,802,348 B2
(45) Date of Patent: *Oct. 31, 2017

(54) HEATER AND THERMOCOUPLE ASSEMBLY

(71) Applicant: Otto Männer Innovation GmbH, Bahlingen (DE)

(72) Inventor: Gheorghe George Olaru, Freiburg (DE)

(73) Assignee: OTTO MÄNNER INNOVATION GMBH, Bahlingen (DE)

( * ) Notice: Subject to any disclaimer, the term of this patent is extended or adjusted under 35 U.S.C. 154(b) by 63 days.

This patent is subject to a terminal disclaimer.

(21) Appl. No.: 14/869,727

(22) Filed: Sep. 29, 2015

(65) Prior Publication Data

US 2016/0082633 A1    Mar. 24, 2016

Related U.S. Application Data

(63) Continuation of application No. 14/249,240, filed on Apr. 9, 2014, now Pat. No. 9,144,930.

(60) Provisional application No. 61/810,217, filed on Apr. 9, 2013.

(51) Int. Cl.
| | |
|---|---|
| *B29C 45/74* | (2006.01) |
| *B29C 45/27* | (2006.01) |
| *B29C 45/44* | (2006.01) |
| *B29C 45/40* | (2006.01) |

(52) U.S. Cl.
CPC .......... *B29C 45/2737* (2013.01); *B29C 45/74* (2013.01); *B29C 45/4005* (2013.01); *B29C 45/4407* (2013.01); *B29C 2045/274* (2013.01); *B29C 2045/2777* (2013.01)

(58) Field of Classification Search
CPC ................................................ B29C 2045/274
See application file for complete search history.

(56) References Cited

U.S. PATENT DOCUMENTS

| | | | |
|---|---|---|---|
| 4,253,011 | A | 2/1981 | Hinz |
| 4,649,262 | A | 3/1987 | Yoshikawa |
| 4,820,147 | A | 4/1989 | Gellert |
| 4,875,845 | A | 10/1989 | Hara et al. |
| 4,892,474 | A | 1/1990 | Gellert |
| 5,360,333 | A | 11/1994 | Schmidt |

(Continued)

FOREIGN PATENT DOCUMENTS

| | | |
|---|---|---|
| DE | 7110931 U | 11/1971 |
| DE | 7225341 U | 1/1977 |

(Continued)

OTHER PUBLICATIONS

"Dura Hot Runner System" Mold-Masters Systems. Jun. 1, 2002.

*Primary Examiner* — Ryan Ochylski
(74) *Attorney, Agent, or Firm* — McAndrews, Held & Malloy, Ltd.

(57) ABSTRACT

A heater and thermocouple assembly for use with a hot runner nozzle with an elongated heater body, said heater body having at least one first heating section, which in operation is positioned adjacent to the front end portion of the hot runner nozzle, and at least one second heating section which in operation is positioned adjacent to a nozzle head of the hot runner nozzle and has an at least partly annular distance section with a wall which is arranged between the first and second heating sections.

8 Claims, 6 Drawing Sheets

(56) References Cited

U.S. PATENT DOCUMENTS

| | | |
|---|---|---|
| 5,411,392 A | 5/1995 | Von Buren |
| 5,820,900 A | 10/1998 | McGrevy |
| 6,043,466 A | 3/2000 | Jenko et al. |
| 6,045,742 A | 4/2000 | McGrevy |
| 6,163,016 A | 12/2000 | Johnson et al. |
| 6,222,165 B1 | 4/2001 | Schwarzkopf |
| 6,252,210 B1 | 6/2001 | Schwarzkopf |
| 6,409,497 B1 | 6/2002 | Wurstlin |
| 6,797,925 B1 | 9/2004 | Guenther |
| 6,805,549 B2 | 10/2004 | Gunther |
| 6,897,418 B1 | 5/2005 | Gunther |
| 7,049,555 B2 | 5/2006 | Sadowski |
| 7,118,703 B2 | 10/2006 | Trudeau |
| 7,118,704 B2 | 10/2006 | Olaru |
| 7,137,806 B2 | 11/2006 | Babin et al. |
| 7,205,511 B2 | 4/2007 | Enrietti |
| 7,280,750 B2 | 10/2007 | Russegger et al. |
| 7,377,770 B2 | 5/2008 | Wurstlin |
| 7,462,031 B2 | 12/2008 | Feick et al. |
| 7,559,760 B2 | 7/2009 | Tabassi et al. |
| 7,914,278 B2 | 3/2011 | Holliday |
| 8,905,741 B2 | 12/2014 | Spuller |
| 9,144,930 B2 * | 9/2015 | Olaru .................. B29C 45/2737 |
| 2004/0121039 A1 | 6/2004 | Olaru |
| 2005/0225000 A1 | 10/2005 | Tabassi |
| 2006/0228440 A1 | 10/2006 | Emich |
| 2007/0124907 A1 | 6/2007 | Russegger et al. |
| 2009/0140465 A1 | 6/2009 | Plumpton |
| 2009/0214693 A1 | 8/2009 | Holliday |
| 2010/0092595 A1 | 4/2010 | Gunther |
| 2010/0092602 A1 | 4/2010 | Gunther et al. |
| 2010/0233310 A1 | 9/2010 | Feick |
| 2011/0186563 A1 | 8/2011 | Schlipf |
| 2012/0189288 A1 | 7/2012 | Vogt et al. |
| 2013/0034621 A1 | 2/2013 | Spuller |

FOREIGN PATENT DOCUMENTS

| | | |
|---|---|---|
| DE | 4445744 C1 | 3/1996 |
| DE | 20108963 U1 | 8/2001 |
| DE | 20109413 U1 | 8/2001 |
| DE | 20118050 U1 | 1/2002 |
| DE | 10333206 A1 | 4/2004 |
| DE | 10358285 A1 | 7/2004 |
| DE | 102004002882 A1 | 9/2004 |
| DE | 10313253 A1 | 11/2004 |
| DE | 202004018132 U1 | 2/2005 |
| DE | 102004009806 B3 | 4/2005 |
| DE | 202006018576 U1 | 4/2008 |
| DE | 202009011904 U1 | 12/2009 |
| DE | 202010010581 U1 | 10/2010 |
| DE | 102009039778 A1 | 3/2011 |
| DE | 102010006356 A1 | 8/2011 |
| EP | 1051059 A2 | 11/2000 |
| EP | 1389517 A1 | 2/2004 |
| EP | 1395085 A2 | 3/2004 |
| EP | 2495085 A1 | 9/2012 |
| GB | 2295758 A | 6/1996 |
| JP | H0788894 A | 4/1995 |
| JP | 2002079549 A | 3/2002 |
| JP | 2002331552 A | 11/2002 |
| JP | 2002347095 A | 12/2002 |
| JP | 2003211493 A | 7/2003 |
| TW | M356609 U | 5/2009 |
| WO | 00/46008 A1 | 8/2000 |
| WO | 2007121823 A | 11/2007 |
| WO | 2009/062239 A1 | 5/2009 |

* cited by examiner

HEATER AND THERMOCOUPLE ASSEMBLY

CROSS-REFERENCE TO RELATED APPLICATIONS

This application is filed as a continuation of U.S. Patent Application Ser. No. 14/249,240, filed April 9, 2014, now U.S. Pat. No. 9,144,930, which claims the benefit of U.S. Provisional Patent Application No. 61/810,217, filed Apr. 9, 2013, the contents of all of which are incorporated by reference herein in their entirety.

BACKGROUND

The present invention is related to a valve gated hot runner apparatus. More specifically, the present invention concerns a removable heater and thermocouple assembly for a hot runner nozzle.

Heater and thermocouple assemblies are used for the temperature control of hot runner nozzles in injection-molding machines. It is desirable for mass-produced injection-molded parts to be as uniform as possible. Temperature fluctuations of the melt can lead to larger dimensional tolerances of the injection-molded parts.

Starting from this, the present invention is based on the object of reducing the temperature fluctuations of the melt.

SUMMARY

In the case of a heater and thermocouple assembly according to the invention for use with a hot runner nozzle, the hot runner nozzle has a valve pin which serves for opening and closing the hot runner nozzle. The hot runner nozzle has a front end portion and a nozzle head. The heater and thermocouple assembly has an elongated and substantially cylindrical heater body with a heat conductive material. The heater body has an inner radius, a length, an axis A, an inner surface, an outer surface and a wall thickness.

The heater body includes at least one first heating section, which in operation is positioned adjacent to the front end portion of the hot runner nozzle. The heater body has at least one second heating section, which in operation is positioned adjacent to the nozzle head of the hot runner nozzle. The heater body has an in particular annular distance section with a wall. The distance section is positioned between the first and second heating sections. The distance section has at least one first heat conducting cross-sectional area $A_D$, arranged substantially perpendicular to the longitudinal axis A. At least one of said heating sections has at least one second heat conducting cross-sectional area $A_H$ arranged substantially perpendicular to the longitudinal axis A. The ratio of the sizes of the first and second cross-sectional areas $(A_D, A_H)$ is $Q=A_D/A_H$, and is less than 0.9.

The heater body includes a helical channel arranged in the outer surface of the heater body. The helical channel is defined by a bottom channel and two lateral walls. The helical channel fully surrounds the helical channel at least once.

The heater and thermocouple assembly includes an electrical heater element having a heater wire located in a heater casing. The heater casing is at least partly arranged in the helical channel and makes direct contact with the bottom surface and with at least one of the two lateral walls in order to spread the heat generated by the heater element along the body of the hot runner nozzle by making contact between the inner surface of the heater body and the outer surface of the hot runner nozzle.

The heater and thermocouple assembly includes at least one thermocouple having a temperature measurement portion. The temperature measurement portion of the thermocouple is positioned so as to measure the temperature of the nozzle at the front end portion of the nozzle.

The heater body of the removable heater and thermocouple assembly according to the invention is preferably assembled with its inner radius surrounding the external radius of a generally elongated, substantially cylindrical hot runner nozzle. A heater and thermocouple assembly preferably controls the temperature of a hot runner nozzle substantially over its total length or over a part of its length, in particular to maintain the flowability of the guided melt in the hot runner nozzle. Thus an adequate temperature control of the front end portion of the hot runner nozzle is particularly important. On the one hand, the temperature of the melt injected into the runner directly influences the quality of the manufactured workpiece. On the other hand, the front end portion of the hot runner nozzle, in particular the nozzle tip, is positioned in direct vicinity of the mold, whereby heat flows away from the hot runner nozzle, in particular to the mold. The elongated heater body is manufactured from a good heat conductive material in order to provide a good heat transfer. Appropriate materials for this are copper or aluminum as well as alloys with at least a proportion of said metals.

Furthermore, it should be checked that the melt does not become locally overheated along the hot runner nozzle. When the melt becomes locally overheated along the hot runner nozzle, the melt can become compromised, which can have negative effects on the quality and/or dimensional stability of the injection-molded parts. In particular, local temperature maxima have been observed in the middle section of the heater body during uniform delivery of heat along the longitudinal axis of the heater body. When the first heat conducting cross-sectional area of the distance section is reduced with respect to the second heat conducting cross-sectional area of one of the heating sections, then the distance section offers a greater thermal resistance which can counteract heat transfer from one or both heating sections. With the development according to the invention of the heater body, local temperature maxima can be counteracted in particular in the distance section, further in particular in the distance section positioned centrally in respect to the longitudinal axis. With the development according to the invention, a uniform temperature profile along the longitudinal axis of the heater body and of the hot runner nozzle, respectively can be achieved. With the development according to the invention, a local overheating of the melt in the heater body and in the hot runner nozzle, respectively can be counteracted. With the development according to the invention, damage to the melt due to overheating can be countered. With the development according to the invention, a higher dimensional stability of the injection-molded parts can be achieved. In this way the underlying object is solved.

According to a preferred further development, the heater element in the distance section is wound with a greater pitch around the heater body than in the first and/or second heating section. In this way, a greater heat flow can be delivered to the heater body in one or both heating sections than in the distance section. Said preferred further development offers the advantage that the development of a local temperature maximum in the distance section can be countered. Said preferred further development offers the advantage that local overheating of the melt in the distance section can be countered.

According to a preferred further development, the thermocouple is guided through aligned channels, in particular drill holes, in the heating sections. Said preferred further development offers the advantage that the assembly of the thermocouple is simplified. Said preferred further development offers the advantage that the positioning of the thermocouple in the heater body, in particular during operation, is improved.

According to a preferred further development, the at least one distance section has in particular a substantially hollow cylindrical shape and an inner distance diameter $r_D$. At least one of the heating sections has a substantially hollow cylindrical shape and an inner heating diameter $r_H$. The ratio of the sizes of said inner diameters ($r_H$, $r_D$) is $Q_S = r_H/r_D$, which is less than 0.8. Said preferred further development offers the advantage that the thermal resistance of the distance section is increased along the longitudinal axis of the heater body and the heater and thermocouple assembly, respectively. Said preferred further development offers the advantage that heat flow from one of the heating sections in the direction of the distance section can be counteracted. Said preferred further development offers the advantage that an overheating of the melt, in particular in the in respect to the longitudinal axis centrally positioned distance section, can be counteracted.

The distance section preferably comprises at least one particularly annular hollow space which extends around the heater body. Said hollow space is preferably filled with an insulating material. Said insulating material is designed to counteract heat flow in the heater body in the distance section, in particular designed as a thermal resistance. The insulating material is preferably chosen from the following group: a gas, a gas mixture, air, a powder with low thermal conductivity, an in particular annular solid body, a ceramic, a Duroplast, in particular a filled Duroplast. Alternatively the at least one hollow space is evacuated. Said preferred configuration offers the advantage that conduction into the heater body in the distance section can be counteracted.

Preferably aligned channels, in particular drilled holes, are positioned in the different heating sections, in particular for the accommodation of a thermocouple. The inner distance diameter is preferably dimensioned so that the hollow space interrupts the aligning channels. Said preferred configuration offers the advantage that the manufacture of the aligned channels is simplified.

According to a preferred further development, the valve pin is guided with at least one, preferably two or more, particularly substantially cylindrical guide elements within the hot runner nozzle. The guide elements are preferably configured with a material which has a negative temperature coefficient. Said preferred further development offers the advantage that the guiding of the valve pin within the hot runner nozzle is improved, in particular with changing temperature of the melt and of the hot runner nozzle, respectively. Said preferred further development offers the advantage that blocking of the valve pin, in particular in the event of varying temperatures of the melt or of the hot runner nozzle, can be countered.

According to a preferred further development, the at least one distance section comprises at least one or a plurality of recesses which reduces the first heat conducting cross-sectional area. Preferably a plurality of said recesses is positioned around a circumference of the distance section. Preferably, one or a plurality of said recesses is arranged as a blind hole, groove or slot. Said preferred further development offers the advantage that the thermal resistance of the distance section along the axis of the heater body or of the heater and thermocouple assembly is increased. Said preferred further development offers the advantage that heat flow from one of the heating sections in the direction of the distance section can be counteracted. Said preferred further development offers the advantage that an overheating of the melt can be counteracted, in particular in the distance section further in particular in the distance section positioned centrally in respect to the longitudinal axis.

According to a preferred further development, the at least one distance section has at least one recess in relation to the longitudinal axis A which extends at least partly through the wall. Preferably, a plurality of said recesses is positioned along a circumference of the distance section. One or a plurality of said recesses is preferably configured as a through-hole, as a slot extending through the wall. Said preferred further development offers the advantage that the thermal resistance of the distance section along the axis of the heater body and of the heater and thermocouple assembly, respectively is increased. Said preferred further development offers the advantage that heat flow from one of the heating sections in the direction of the distance section can be counteracted. Said preferred further development offers the advantage that an overheating of the melt can be counteracted, in particular in the distance section further in particular in the distance section positioned centrally in respect to the longitudinal axis.

The thermocouple is preferably guided through one of said recesses, particularly preferably up to or through one of the heating sections. Said preferred configuration offers the advantage that the assembly of the thermocouple is simplified.

At least one said recess is preferably configured for connecting with a fluid channel. The fluid channel particularly preferably serves the purpose of exchanging a temperature controlling fluid with the distance section. Said preferred configuration offers the advantage that the temperature profile along the axis of the heater body can be influenced in particular by adjusting the entry temperature of the temperature controlling fluid in the distance section and/or by adjusting the mass flow of the temperature controlling fluid in the distance section.

According to a preferred further development, the at least one distance section is configured with at least one bridge which reduces the first heat-conducting cross-sectional area between the heating sections. Preferably, the at least one distance section is configured with two, three, or more of such bridges between the heating sections. Said preferred further development offers the advantage that the thermal resistance of the distance section along the axis of the heater body and of the heater and thermocouple assembly, respectively is increased. Said preferred further development offers the advantage that heat flow from one of the heating sections in the direction of the distance section can be counteracted. Said preferred further development offers the advantage that an overheating of the melt can be counteracted, in particular in the distance section further in particular in the distance section positioned centrally in respect to the longitudinal axis.

According to a preferred further development, the thermocouple is guided, at least in sections, substantially parallel to the axis A through one or two of the heating sections. Said preferred further development offers the advantage that the thermocouple is better protected by the heater body. Said preferred further development offers the advantage that the positioning of the thermocouple is improved, in particular during the operation of the heater and thermocouple assembly.

A first preferred arrangement comprises a heater and thermocouple assembly and a sleeve. The sleeve has a wall and is at least in sections positioned around the heater and thermocouple assembly. The sleeve is configured to contain the electrical heater element in the runner of the heater housing. The sleeve preferably surrounds the electrical heater element or the heater housing by a positive-locking or force-locking fit. Said preferred arrangement offers the advantage that the thermal contact between the heater element and the heater body is improved. Said preferred arrangement offers the advantage that the fitting of the heater and thermocouple assembly in an injection molding machine is simplified. Said preferred arrangement offers the advantage that a local temperature maximum in the distance section can be countered. Said preferred further arrangement offers the advantage that an overheating of the melt can be countered.

The sleeve is preferably configured with a heat conducting material. The sleeve preferably covers, at least in sections, both the distance section and at least one of the heating sections. Said preferred arrangement offers the advantage that an in particular undesired temperature maximum can be counteracted. Said preferred configuration offers the advantage that heat can be carried away from the distance section in the direction of at least one of the heating sections.

According to a preferred further development of the first arrangement, the sleeve is substantially hollow and cylindrical. The sleeve preferably has differing wall thicknesses at at least two axial positions relative to the longitudinal axis A, in particular differing external diameters. Preferably the wall thickness, particularly preferably the external diameter of the sleeve in the distance section is smaller than in at least one of the heating sections. Said preferred further development offers the advantage that the thermal resistance perpendicular to the axis A in the distance section is reduced. Said preferred further development offers the advantage that the heat dissipation is improved in particular perpendicular to the longitudinal axis A to the surroundings of the sleeve in the distance section. Said preferred arrangement offers the advantage that a local temperature maximum in the distance section can be countered. Said preferred arrangement offers the advantage that an overheating of the melt can be countered.

A second preferred arrangement, in comparison with the first preferred arrangement, also comprises a hot runner nozzle. The hot runner nozzle is guided at least partly through the heater and thermocouple assembly. Said preferred arrangement offers the advantage that the transfer of heat to the hot runner nozzle is improved. Said preferred arrangement offers the advantage that the temperature distribution along the longitudinal axis of the hot runner nozzle can be more uniform. Said preferred arrangement offers the advantage that a local temperature maximum in the distance section can be countered. Said preferred arrangement offers the advantage that overheating of the melt can be countered.

According to a preferred further development of the second arrangement, an in particular annular heat conducting element is positioned in the front portion of the hot runner nozzle, in particular adjacent to a nozzle tip of the hot runner nozzle. The heat conducting element creates a heat conductive connection between the front portion of the hot runner nozzle and the temperature measurement portion of the thermocouple. The thermocouple is preferably heat conductive, in particular connectable with a force-locking fit with the heat conducting element. The front portion of the hot runner nozzle is preferably heat conductive, in particular connectable with a force-locking fit with the heat conducting element. Said preferred further development offers the advantage that one can forgo installing the thermocouple directly in the front portion of the hot runner nozzle, so that the assembly of the second arrangement is simplified.

BRIEF DESCRIPTION OF THE SEVERAL VIEWS OF THE DRAWINGS

Further advantages, features and application possibilities of the present invention result from the following description in connection with the figures. In the figures:

FIG. 2a shows a view of section I-I, running along the section line shown in FIG. 2;

DETAILED DESCRIPTION

Figure 1:
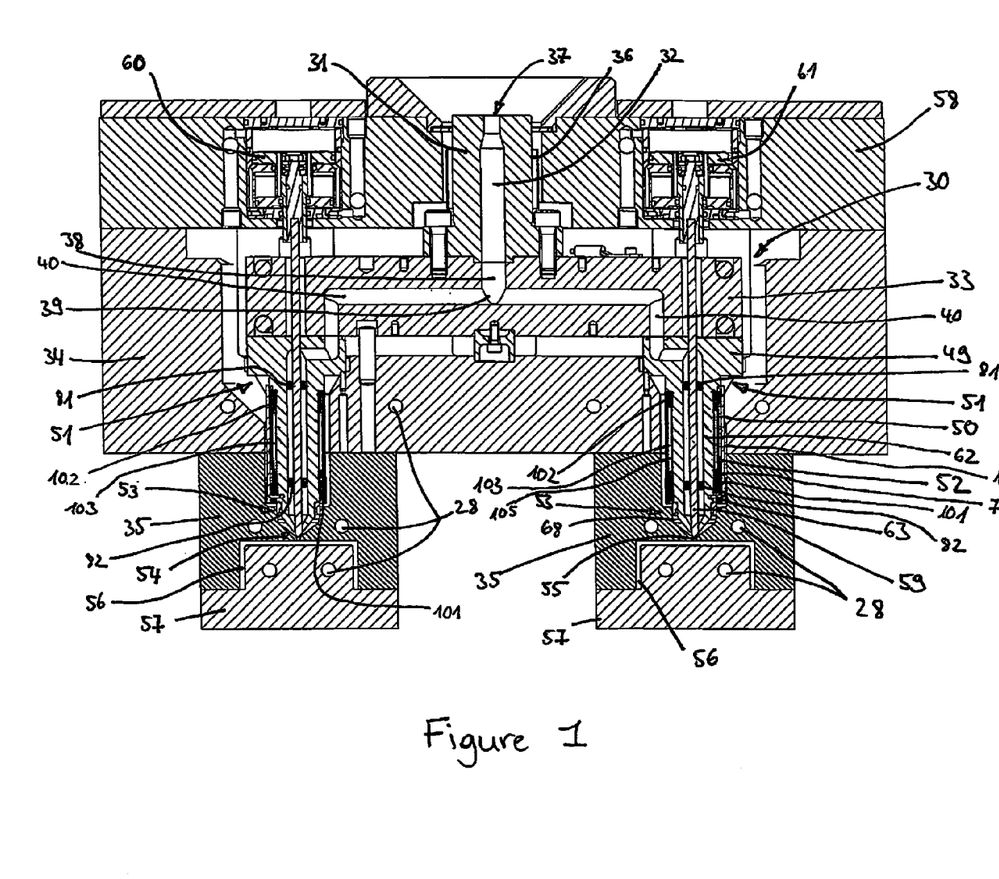
FIG. 1 shows a cross-sectional view of a part of an exemplary injection-molding machine equipped with hot runners, in which a heater and thermocouple assembly according to the invention is used.

FIG. 1 shows a cross-sectional view of a part of an exemplary injection-molding machine equipped with hot runners with a hot runner system 30. The hot runner system 30 comprises a hot runner distributor block 33 as well as a plurality of hot runner nozzles 50, in this example two hot runner nozzles 50. The machine nozzle (not shown) is connected in the example to two hot runner nozzles 50 via a sprue bushing 31 and a hot runner distributor block 33. Each of the hot runner nozzles 50 meets with a mold, wherein each mold is formed from a mold insert 35 and a mold core 57. The mold insert 35 and the mold core 57 each surround a cavity 56 arranged therein.

The sprue bushing 31 comprises an inlet opening 37 which faces the machine nozzle and guides the melt to the hot runner distributor block 33 via the melt runner 32. The melt runner 38 arranged here has a branch point 39 from which further melt runners 40 lead to the hot runner nozzles 50, in the exemplary embodiment two shown hot runner nozzles 50. The hot runner nozzles 50 are connected to the hot runner distributor block 33 at the nozzle heads 49, wherein said nozzle heads 49 are positioned in the rear end portion 51 of the hot runner nozzle 50. In this way, the hot runner nozzles 50 are also attached to the melt runner 40. Each said hot runner nozzle 50 has a nozzle body 62 for delivering the melt from a melt runner 40 in the hot runner distributor block 33 to a cavity 56. Each hot runner nozzle 50 has a valve 54 in its front end portion 53, wherein said valve's 54 outlet opening 55 is connected to a cavity 56. The hot runner system 30 is positioned in a heated-runner plate 34.

A plurality of heater elements is positioned inside the hot runner distributor block 33, wherein said heater elements control the temperature of the hot runner distributor block 33, in order to keep the melt in the melt runners 38, 40 fluid and/or flowable. The heater elements can be configured as electrical heating conductors. A further heater element 36 is fitted at the sprue bushing 31 for controlling the temperature of the melt runner 32.

A heater and thermocouple assembly 52 is fitted at each hot runner nozzle 50 for controlling the temperature of the melted material in the nozzle body 62. One or a plurality of thermocouples 63 serves to directly or indirectly measure the temperature of the melt in the nozzle body 62 and/or to measure temperatures at the nozzle body 62. The nozzle body 62 can thus be formed from a plurality of parts.

The heater body 70 positioned around the nozzle body 62 has a first heating section 101 which is positioned in operation adjacent to the front end portion 53 of the hot runner nozzle 50. The heater body 70 also has one second heating section 102 which is positioned in operation adjacent to the nozzle head 49 of the hot runner nozzle 50. The heater body 70 also has one annular distance section 103 with a wall 104. The distance section 103 is thus positioned between the first heating section 101 and second heating section 102.

A valve pin 59, which is axially adjustable, is positioned in each hot runner nozzle 50. The valve pin 59 of each hot runner nozzle 50 is guided in the exemplary embodiment through two guide elements 81, 82 within the nozzle body 62. Furthermore, a valve 54 is positioned in the front end portion 53 of each hot runner nozzle 50. The valve pin 59 can be placed in a locked position at the valve seat of the valve 54, wherein said valve 54 is sealing positioned with its outlet opening 55 at the mold insert 35.

The valve pins 59 run parallel to one another and are fixed to pistons 61 at their ends further from the valve seat. The pistons 61 are movably held in a pneumatic plate 58, wherein the movement is axial to the valve pin 59. The valve pins 59 are axially adjustable, with the help of the pistons 61, relative to the hot runner nozzles 50 and therefore to the valves 54, in at least two positions, an open position and a closed position. Thus the valves 54 of the hot runner nozzles 50 can be opened and closed independently from one another, in order to control the quantity of melt which is injected into each cavity 56 by the hot runner system 30.

Figure 1A:
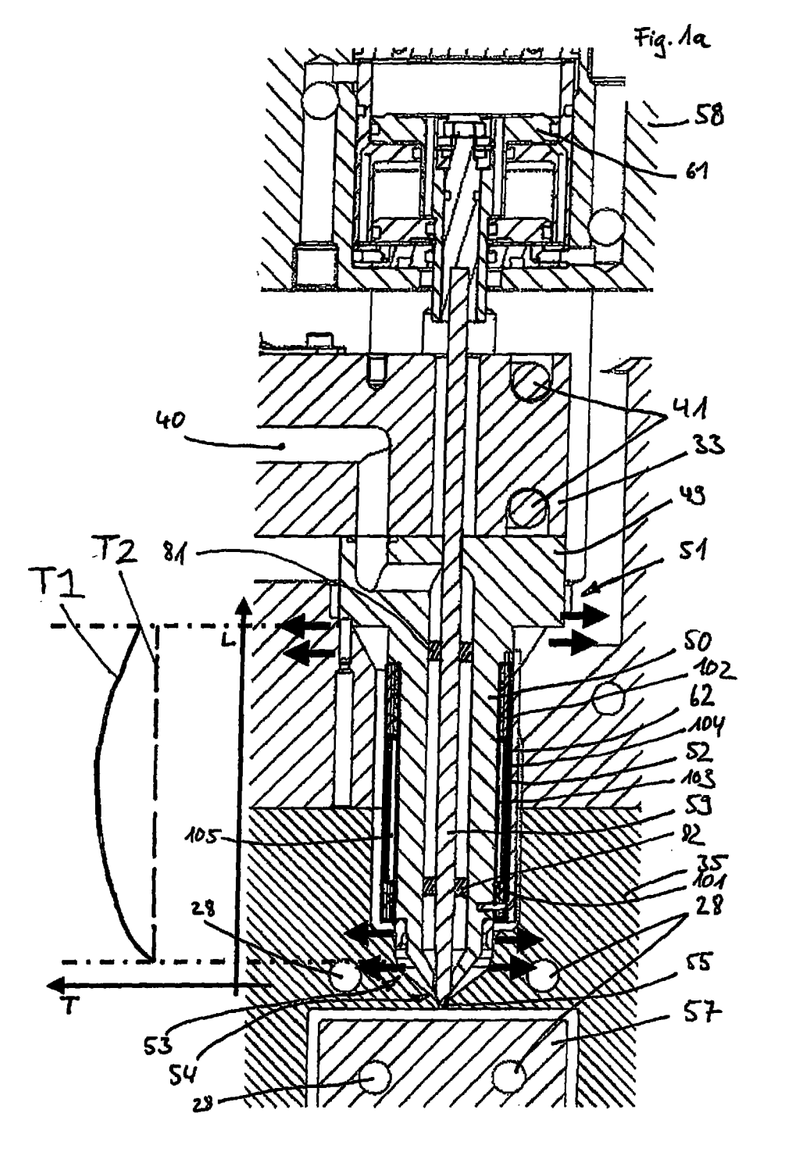
FIG. 1a shows a detail of the cross-sectional view of FIG. 1 in the region of one of the hot runner nozzles.

FIG. 1a shows a detail of the cross-sectional view of FIG. 1 in the region of the hot runner nozzle 50 shown on the right in FIG. 1. A heater and thermocouple assembly 52 is fitted to said hot runner nozzle 50 for controlling the temperature of the melted material in the nozzle body 62. Also shown is the valve pin 59 which is positioned in the hot runner nozzle 50 and is adjustable with the help of the piston 61, wherein said valve pin 59 is guided within the hot runner nozzle 50 by two guide elements 81, 82 and serves to dispense, at the valve 54, the quantity of melt injected into the cavity 56. The pistons 61 are movably stored in the pneumatic plate 58.

The hot runner nozzle 50 has its rear end portion 51 arranged such that the nozzle head 49 is positioned at the hot runner distributor block 33. The melted material is delivered from the melt runner 40 to the rear end portion 51 of the hot runner nozzle 50 via an opening formed in the nozzle head 49. In the nozzle body 62, the melt is delivered to the valve 54 and to the outlet opening 55 and from there is injected into the cavity 56 which is enclosed by the mold insert 35 and the mold core 57.

Temperature controlling channels 28 are arranged in the mold insert 35, the mold core 57 as well as in the hot runner plate 34 (see FIG. 1). The hot runner plate 34 is cooled with respect to the surroundings and the components bordering the hot runner plate with the help of the temperature controlling channels 28. The temperature controlling channels 28 arranged in the mold insert 35 and the mold core 57 serve to control the temperature of the mold. A desired mold temperature is created by the temperature controlling medium which is guided in said channels. Said mold temperature promotes a directional solidification of the melt. In this way, the component quality is increased and the cycle time of the injection-molding machine is shortened. However, the temperature control of the mold or of the heated-runner plate 34 is accompanied by an outflow of heat from the front end portion 53 and the rear end portion 51 of the hot runner nozzle 50. Said outflow of heat is represented in FIG. 1a by the indicative arrows in the region of the mold insert 35 as well as in the region of the front end portion 53. The outflow of heat from the rear end portion 51 of the hot runner nozzle 50 into the heated-runner plate 34 is represented in the same way by the indicative arrows near said rear end portion 51.

An outflow of heat specifically in the front end portion 53 of the hot runner nozzle 50 is undesired, because the melt stored there between two injection processes must have a certain minimum temperature so as not to solidify too early during the injection process within the cavity 56. An early solidifying of the melt prevents a complete filling of the mold, whereby the produced component has poor quality or is even unusable. As a further measure to prevent an outflow of heat from the front end portion 53 of the hot runner nozzle 50, an insulator 68 is positioned around said front end portion 53, wherein said insulator 68 supports the front end portion 53 of the hot runner nozzle 50 which is positioned in the recess in the mold insert 35.

In FIG. 1a, the temperature T along the length L of the hot runner nozzle 50 starting from its front end portion 53 is plotted in a graph to the left of the illustrated hot runner nozzle 50. A first temperature distribution T1 shows the temperature of the prior art hot runner nozzle. As can be seen in this graph, the temperature T1 is lowest in the front end portion 53 of the hot runner nozzle 50. Said region of the hot runner nozzle 50 is adjacent to the mold core 57 which has a significantly lower temperature than the hot runner nozzle 50, because of the temperature controlling medium which is guided into the temperature controlling channels 28.

The heater and thermocouple assembly 52 is fitted around the perimeter of the hot runner nozzle 50 and extends from a front end portion 53 up to a rear end portion 51 of the hot runner nozzle 50. The illustrated heater and thermocouple assembly 52 has a heating section 101 adjacent to the front end portion 53 and a heating section 102 adjacent to the rear end portion 51 of the hot runner nozzle 50. A distance section 103 is positioned in between, wherein said distance section 103 limits the heat transfer between the heater and thermocouple assembly 52 and the hot runner nozzle 50. The purpose of this form of the heater and thermocouple assembly 52 is to achieve a temperature distribution which is as close as possible to the ideal temperature distribution shown on the graph as T2. The temperature of the hot runner nozzle 50 as well as the melt in the hot runner nozzle 50 remains largely constant. This results in an improved and uniform component quality.

A heat flow takes place from the regions of the hot runner nozzle 50 which are positioned outside the heater and thermocouple assembly 52 into the surrounding components and/or into the surrounding atmosphere. For this reason, the heating sections 101, 102 transfer heat in these areas to the hot runner nozzle 50, while a transfer of heat to the hot runner nozzle 50 in the region of the distance section 103 is not necessary.

Figure 2:
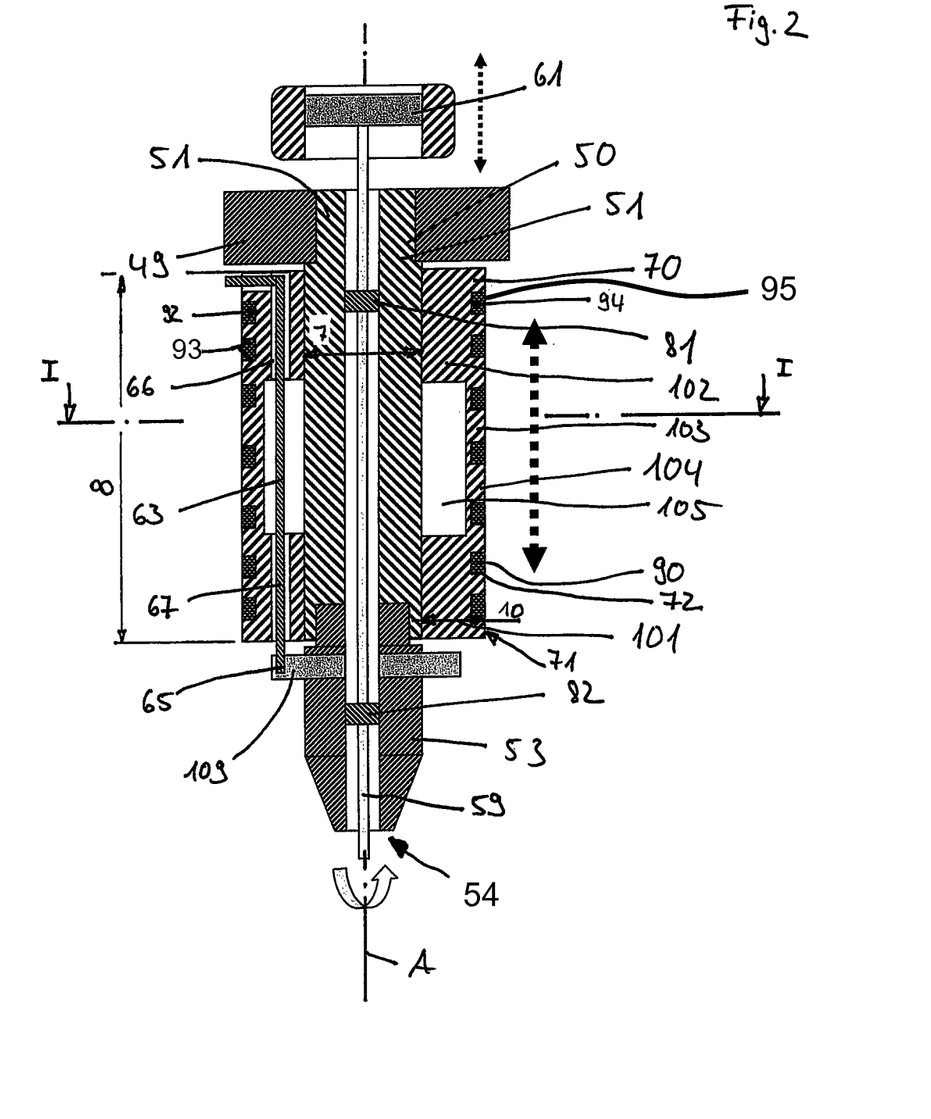
FIG. 2 shows an exemplary heater and thermocouple assembly which is positioned on a hot runner nozzle.

FIG. 2 shows a heater and thermocouple assembly 52 positioned on a hot runner nozzle 50. The hot runner nozzle 50 is connected to a hot runner distributor block 33 with the nozzle head 49 which is positioned at the rear end portion 51 of the hot runner nozzle and is connected to a melt runner 40.

The melt processed by the hot runner injection machine is conveyed into a melt runner which runs inside the hot runner nozzle 50 from its rear end portion 51 to its front end portion 53 and to the valve 54 arranged in the front end portion 53. A heater body 70 is positioned on the hot runner nozzle 50, wherein said heater body 70 has an inner diameter 7, a length 8, an axis A, an outer surface 71 and a wall thickness 10.

A helical channel 72 is arranged around the outer surface of the heater body 70. The helical channel 72 has a bottom surface 92 and two lateral walls 93, wherein the helical channel 72 fully surrounds the heater body 70 at least once. A heater element 90 with a heater wire 94 is embedded in the helical channel 72 for temperature control of the hot runner nozzle 50.

In axial direction a thermocouple 63 is positioned radially inside the heater body 70 as well as radially inside the coils of the heater element 90. The front end 65 of the thermocouple 63 is positioned in an annular heat conducting element 109. Said heat conducting element 109 is fitted in the front end portion 53 and adjacent to the nozzle tip. In the exemplary embodiment, said front end portion 53 lies in the region of the nozzle tip, wherein said nozzle tip is fixed in a nozzle body 62. Said fixing is exemplarily configured as a screwed connection. The heat conducting element 109 produces a heat conductive connection between the front end portion 53 of the hot runner nozzle 50 and the temperature measurement portion 65 of the thermocouple 63. The thermocouple 63 is arranged in two mutually aligned openings 66, 67. In the exemplary embodiment, said openings 66, 67 are formed from two drill holes parallel to the longitudinal axis A of the heater body 70. Because of the opening 105 which is arranged in the wall 104 of the distance section 103 and between the heating sections 101, 102, the holes 66, 67 can each be drilled from different axial ends of the heater body 70. In this way, the thermocouple 63 is also accessibly positioned in the heater body 70. The temperature measurement portion 65 is in a region in which it is necessary to know the exact temperature of the hot runner nozzle 50 and/or the melt inside said hot runner nozzle 50 in particular for the purpose of controlling the heating power of the heater and thermocouple assembly 52 due to the heat flow from said region. Said design allows, in addition to creating an appropriate temperature profile, a suitable measurement of the temperature at the hot runner nozzle 50 with the temperature measurement portion 65 of the thermocouple 63 positioned in the heater body 70.

The valve pin 59 is guided within the hot runner nozzle 50 by two guide elements 81, 82. The valve pin 59 is fixed to the piston 61 at its end further from the valve seat. The valve pin 59 is axially adjustable relative to the hot runner nozzle 50 with the help of the piston 61, and therefore adjustable relative to the valve 54.

FIG. 2a shows the section I-I of FIG. 2, said section passing through the hot runner nozzle 50 as well as through the heater and thermocouple assembly 52 positioned on it, in the region of the distance section 103. The section I-I passes through the first heat conducting cross-sectional area $A_D$, which is delimited by the outline of the recess 105, which is arranged in the area of the wall 104 of the distance section 103. Furthermore, the section I-I shows the second heat conducting cross-sectional area $A_H$ delimited by the outline of the heater body 70. The ratio $Q=A_D/A_H$ amounts to 0.37 in the exemplary embodiment.

The distance section 103 of the exemplary embodiment shown in FIGS. 2 and 2a has a hollow cylindrical shape and an inner distance diameter $r_D$. The heating section 101, which is visible behind the plane of section I-I, likewise has a hollow cylindrical shape and an inner heating diameter $r_H$. The ratio of the size of the inner distance diameter $r_H$ to the size of the inner heating diameter $r_D$ is $Q_S=r_H/r_D$, which amounts to 0.71 in the exemplary embodiment.

Figure 3:
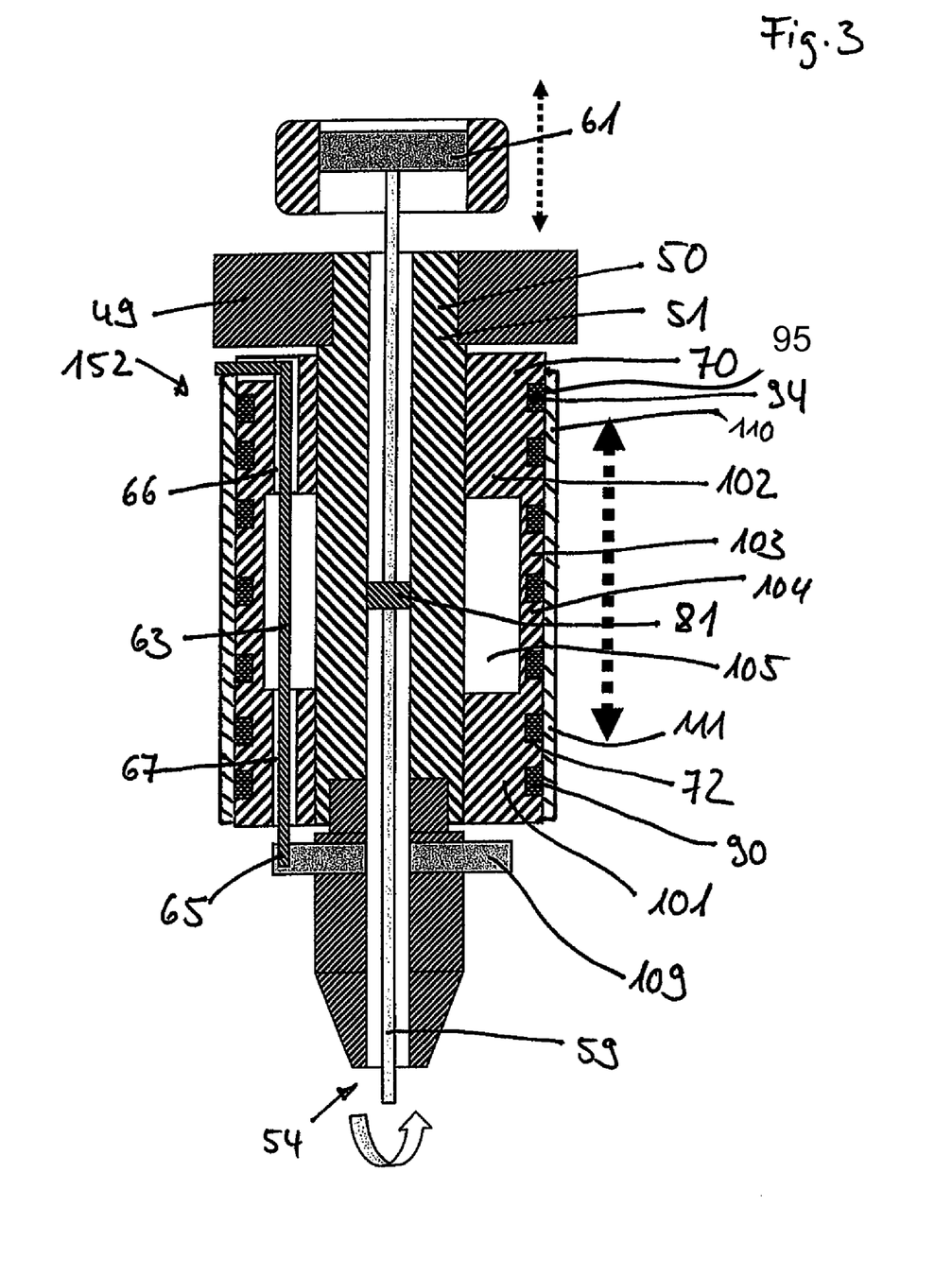
FIG. 3 shows a further exemplary heater and thermocouple assembly which is positioned on a hot runner nozzle.

FIG. 3 also shows a heater and thermocouple assembly 152 positioned on a hot runner nozzle 50, wherein said heater and thermocouple assembly 152 differs from the heater 70 and thermocouple 63 assembly 52 from FIG. 2 through the application of only one guide element 81 for guiding the valve pin 59 as well as differing through the positioning of a sleeve 110 at the heater 70 and thermocouple 63 assembly 152. The sleeve 110 has a wall 111. The sleeve 110 shown in the exemplary embodiment serves to improve the conduction of heat from the distance section 103 to the first 101 and second 102 heating section.

Figure 4:
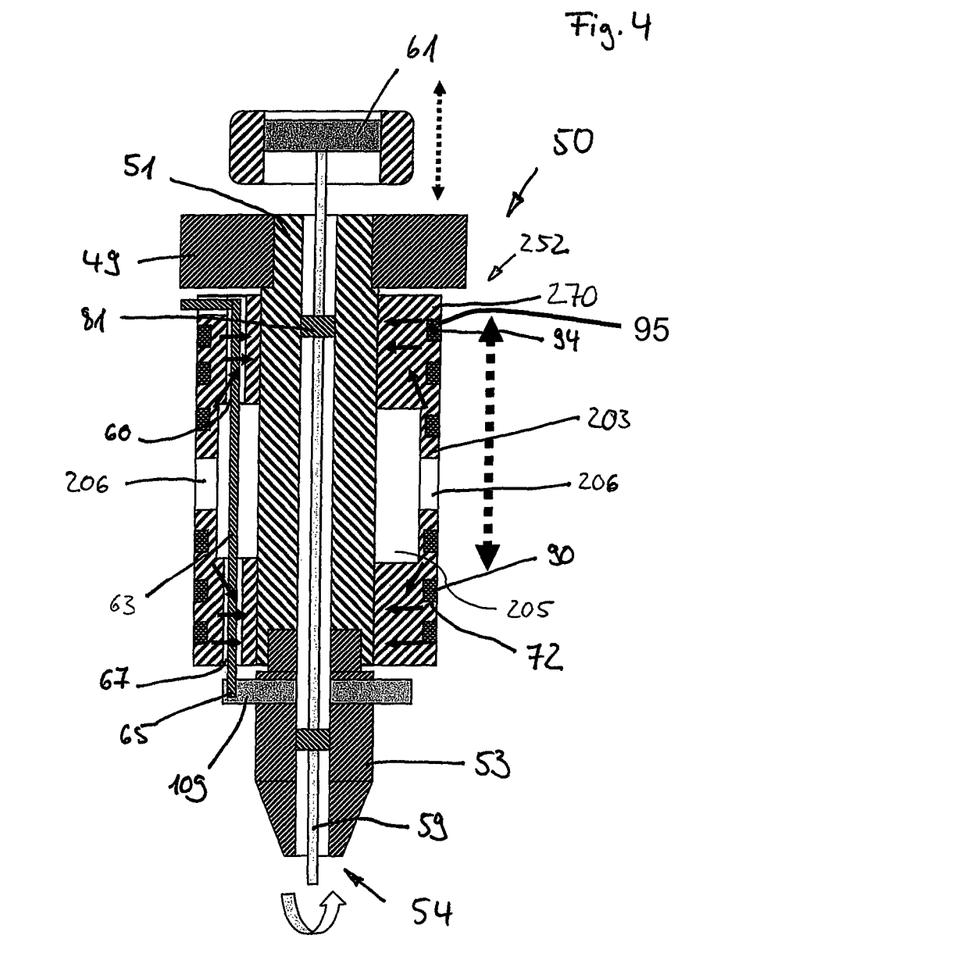
FIG. 4 shows a further exemplary heater and thermocouple assembly which is positioned on a hot runner nozzle.

FIG. 4 shows a further heater and thermocouple assembly 252 arranged on a hot runner nozzle 50, wherein said heater and thermocouple assembly 252 differs from the heater 70 and thermocouple 63 assembly 52 of FIG. 2 through the arrangement of further recesses 206 in the region of the distance section 203, wherein said recesses 206 extend at least partially through the wall 204 of the distance section 203. The illustrated recesses 206 take the form of circular through-holes drilled in the wall. However, every other shape is possible for the recesses, for example elliptical, square, or slit-like. In particular, it is also possible to arrange a plurality of recesses 106 to be distributed over the circumference, so that the connection between the two heating sections 201, 202 is achieved only through thin bridges. In particular, it is also possible to arrange a plurality of channels 72 in the region of the distance section 203, wherein no heater element 90 is embedded in said channels 72 and wherein said channels 72 constitute recesses 206.

Further arrows are shown in FIG. 4, which illustrate the heat flow in the region of the heating sections 201 and 202 from the heater body 270 to the hot runner nozzle 50.

The invention claimed is:

1. An injection molding hot runner apparatus comprising:
a hot runner distributor block;
a plurality of hot runner nozzles coupled to the distributor block, each hot runner nozzle having a nozzle head, a nozzle body, a melt channel, a nozzle tip, and a valve positioned in a front end portion of the nozzle;
a plurality of valve pins associated with the plurality of hot runner nozzles, each valve pin being guided by at least one guiding element positioned in the melt channel adjacent the valve;
a plurality of heater and thermocouple assemblies,
wherein each assembly is fitted around each hot runner nozzle for controlling the temperature of the melted material in the nozzle body,
wherein each heater has a heater body positioned around the nozzle body,
wherein the heater body has
a first heating section which is positioned during operation in contact with a front end portion of the hot runner nozzle,
a second heating section positioned during operation in contact with the nozzle head of the hot runner nozzle, and
an intermediate annular section distanced from the nozzle body to reduce heat transfer to the nozzle body;
a thermocouple positioned along the heater body, wherein a front end of the thermocouple is positioned outside the heater body to measure the temperature delivered by the heater at the nozzle tip; and wherein the nozzle tip is removably coupled to the nozzle body.

2. An injection molding hot runner apparatus according to claim 1, where the front end of the thermocouple is positioned in an annular heat conducting element.

3. An injection molding hot runner apparatus according to claim 2, where said heat conducting element is fitted in the front end portion and adjacent to the nozzle tip.

4. An injection molding hot runner apparatus according to claim 3, where the heat conducting element produces a heat conductive connection between the front end portion of the hot runner nozzle and the temperature measurement portion of the thermocouple.

5. An injection molding hot runner apparatus according to claim 1, where the thermocouple is arranged in two mutually aligned openings.

6. An injection molding hot runner apparatus according to claim 1, where the thermocouple is guided through one of the heating sections.

7. An injection molding hot runner apparatus according to claim 1, where the heater body is a sleeve, and where the sleeve has a substantially hollow cylindrical shape.

8. An injection molding hot runner apparatus according to claim 7, where the sleeve has a longitudinal axis and a wall thickness that differs at at least two axial positions relative to the longitudinal axis.

* * * * *